N. ALCHEVSKY.
LAND DIGGING OR EARTH EXCAVATING MEANS OR DEVICE.
APPLICATION FILED MAY 20, 1918.
1,310,728.
Patented July 22, 1919.
2 SHEETS—SHEET 2.
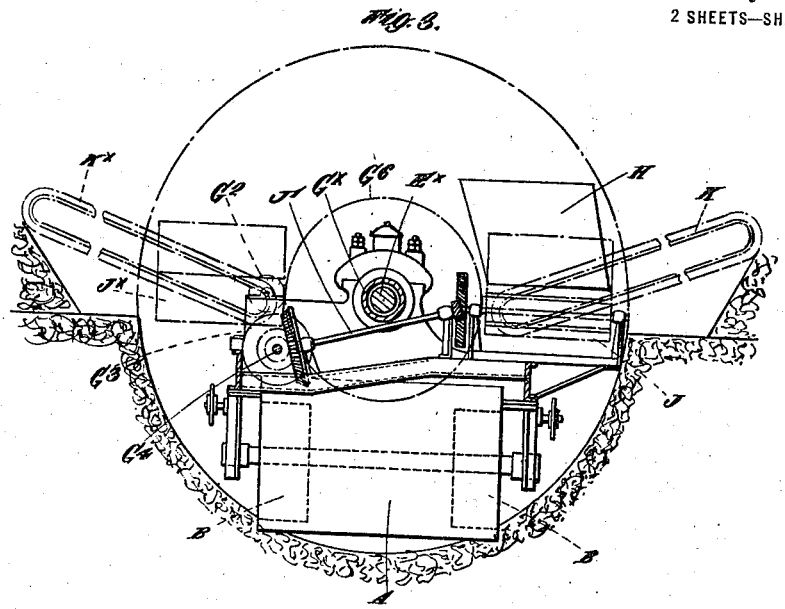
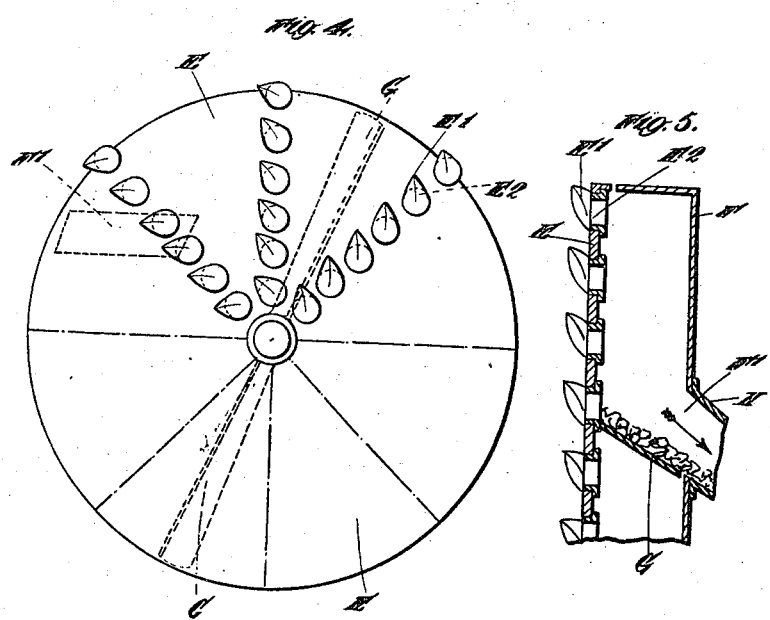

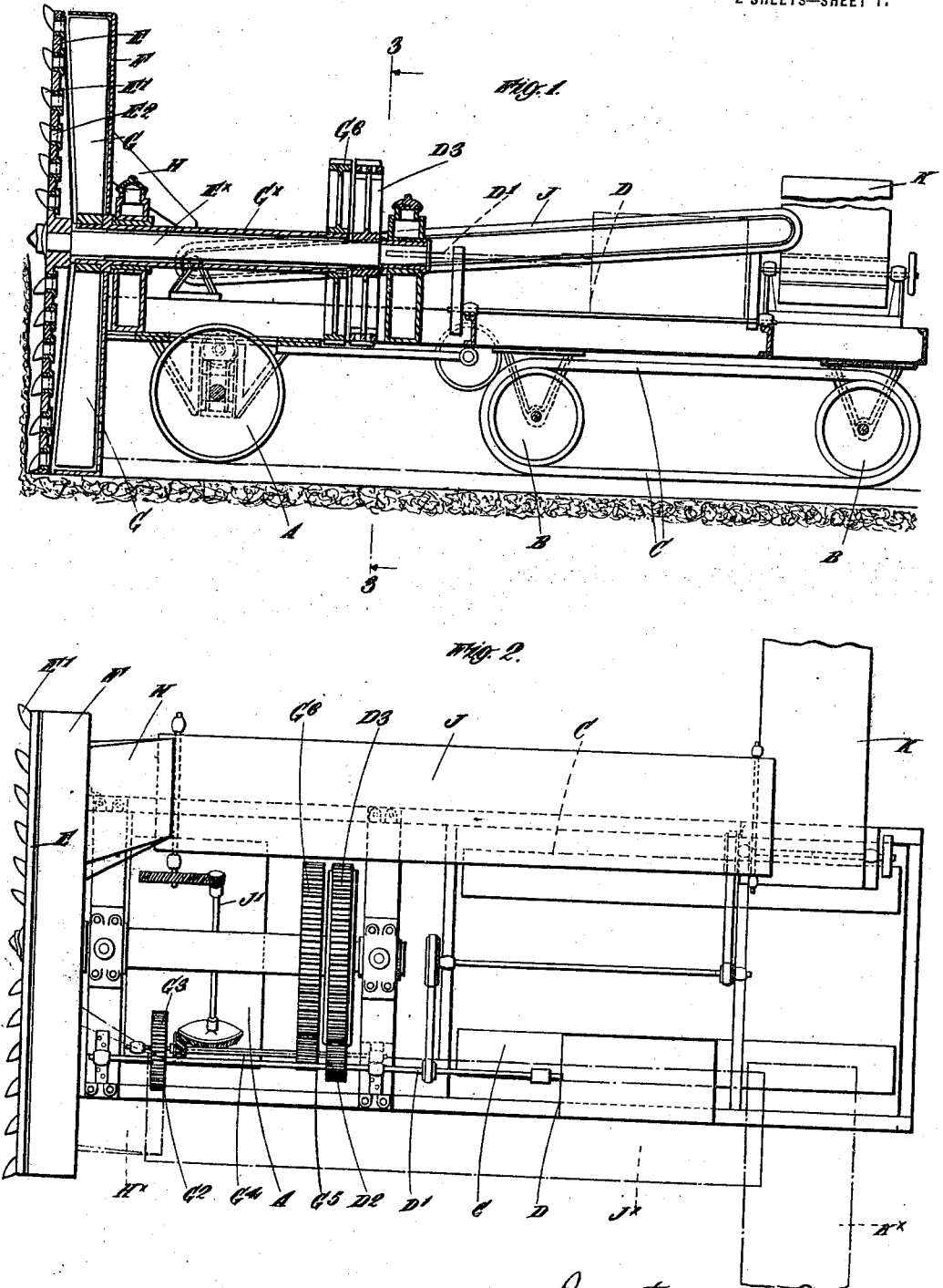

UNITED STATES PATENT OFFICE.

NAOUM ALCHEVSKY, OF ACTON HILL, LONDON, ENGLAND.

LAND-DIGGING OR EARTH-EXCAVATING MEANS OR DEVICE.

1,310,728.     Specification of Letters Patent.     Patented July 22, 1919.

Application filed May 20, 1918. Serial No. 235,713.

*To all whom it may concern:*

Be it known that I, NAOUM ALCHEVSKY, a Russian subject, residing at 20 Twyford avenue, Acton Hill, London, in the county of Middlesex, England, have invented certain new and useful Improvements in or Relating to Land-Digging or Earth-Excavating Means or Devices, of which the following is a specification.

This invention relates to land digging or earth-excavating means or machines, and is intended for use in making canals, channels, trenches, roads, tunnels and the like and also for cultivating, the chief object being to enable the digging or excavating operations to be accomplished expeditiously with a minimum of manual labor. The invention has particular reference to such machines of the kind in which the earth or material removed by a rotary digging device is directed into or onto a conveyer which carries it to a suitable position where it is discharged.

According to this invention the digging or excavating device is in the form of a rotary circular plate having teeth or cutters thereon adjacent to openings in the plate through which openings the excavated earth or material passes into a collector containing rotary blades, vanes, palettes or the like which are arranged to discharge the earth through an opening in the rear of the collector preferably on to a conveyer or conveyers so that the earth may be deposited at the side or sides of the machine or at the rear thereof, according to the particular use of the machine. For instance when the machine is employed for making channels, trenches or the like, the excavated earth may be discharged at the side or sides and when the machine is used for cultivating or for making tunnels the earth may be discharged at the rear of the machine and in the case of making tunnels it may be deposited into trucks which carry the earth to the commencement of the tunnel.

In order that the invention may be clearly understood and readily carried into effect the same will now be described more fully with reference to the accompanying drawings, in which—

Figures 1 and 2 are respectively a sectional side view, and a plan of one embodiment of the invention as applied for making channels, canals or trenches, particularly channels for irrigation purposes.

Fig. 3 is a transverse section taken approximately on the line 3—3 of Fig. 1 showing the conveyers in dot and pick lines.

Fig. 4 is a front view of the rotary digging plate.

Fig. 5 is a detail view hereinafter referred to.

In the example shown, the chassis or frame of the machine is mounted on a front wheel or roller A which may be provided with suitable land gripping means on its periphery and on rear wheels B having endless bands or tracks C around them as shown in Fig. 1. The rear wheel B may be driven by a motor for example a petrol motor D on the machine and the front wheel A may be movable for steering. At the forward part of the machine and mounted on a shaft $E^x$ driven by the motor shaft $D'$ through gear wheels $D^2$, $D^3$ is the circular digging plate E, having on its front face several radial rows of teeth $E'$ extending from the center of the plate to (or near to) the periphery thereof; the teeth may be so arranged that those in one radial row are staggered or alternately disposed with respect to the teeth in the next radial row and so on around the plate. Each tooth $E'$ which is located adjacent to an opening $E^2$ in the plate may be formed with a sharp point and an angular edge so as to be approximately V-shaped in section, thus forming a scoop or a shovel for collecting and directing the excavated earth through the adjacent opening $E^2$ into a drum or collector F at the rear of the plate E as the latter rotates. The teeth $E'$ and openings $E^2$ may, if desired, increase in size from the center of the plate to the periphery thereof and in some cases the teeth may be punched up from or formed integrally with the plate or they may be constructed separately and attached in any suitable manner to the plate. The size and shape of the teeth and also the size of the openings, however, are selected according to the nature of the earth soil to be removed and the plate may be detachable to enable other plates having different teeth and openings to be used. The forward speed of the machine and the rotary speed of the plate may be regulated or controlled according to the nature of the soil being removed. When making channels, trenches or the like only the lower half or portion of the digging plate engages with the soil during its rotation as shown in Fig. 1.

The drum or collector F at the rear of the plate E is of cylindrical form and of about the same diameter as the plate and is open at the end adjacent to the plate to receive the excavated earth passed through the said openings E² in the plate, but is closed at the rear end or part except for an opening F' see Figs. 4 and 5. The drum F is stationary and may be supported on the machine in any appropriate manner. Within the drum F and adapted to rotate therein in either direction is a series of blades, vanes or palettes G fixed to a rotary sleeve G× driven by the motor shaft D' through gear wheels, G², G³ a countershaft G⁴ and gear wheels G⁵ G⁶. The blades or palettes G are of such width and length as to closely fit between the drum F and the digging plate E, and are inclined in such a manner that the earth which collects on the blades during their rotary movement slides by the action of gravity through the said opening F' in the rear end of the drum as the blades pass the opening, see Fig. 5. In this manner the earth although it is collected in the drum is not allowed to accumulate therein as it is continually being removed therefrom by the rotating blades.

Adjacent to the said opening F' in the drum F is the upper end of an inclined tube or chute H which can be readily moved rearwardly away from the drum or otherwise if and when desired, for example in the case of a tunneling machine. The tube or chute H receives the excavated earth deposited therein through the opening in the drum by the said rotary blades or palettes and directs the earth on to a moving conveyer J arranged approximately parallel to the longitudinal axis of the machine.

The moving conveyer J which is supported upon the machine may be in the form of a traveling or endless band passing around a number of rotary rollers or toothed wheels driven from the said motor shaft D' through the counter shaft G⁴ and the transverse shaft J' and may be composed of a number of wooden strips which form a flush or flat upper surface which carry the material along until the band passes around the rearmost roller or wheel when the excavated earth falls on to another similar moving band conveyer K supported on the machine and arranged transversely approximately at right angles to the longitudinal conveyer J; the latter is inclined upwardly in a rearward direction and the transverse conveyer K which as shown in Fig. 2 may be driven by belt gearing from the motor is also inclined or directed upward from the point where it receives the earth from the longitudinal conveyer J. If desired a second set of conveyers J×, K× may be disposed on the opposite side of the machine as shown by the dot-and-dash lines in Figs. 2 and 3 and in this case a second opening is provided in the rear of the drum F and an additional chute H×. As the machine travels forward, the earth removed by the digging plate E is conveyed by means of the chutes H and H× and the aforesaid conveyers J, J×, K, K× to the sides of the machine thereby forming an embankment or dike on each side of the channel or trench made by the digging plate, see Fig. 3; only one embankment may be made during the operation of the machine and this may be effected by means of a suitably arranged conveyer between the two side conveyers causing the earth discharge from the two longitudinal conveyers to be conveyed to one side or the other of the machine. If desired, however, either one of the openings in the drum may be closed so that the earth is directed to one side of the machine or the other. Thus the machines may be adapted to form two embankments simultaneously or only one at either side. In a modification only one longitudinal conveyer may be used and in conjunction with two transverse conveyers, by making it movable to discharge the earth to one or other of the transverse conveyers. The tops of the dikes or embankments may be formed into roads by leveling and concreting or asphalting. When a large canal is to be made, the machine after making one excavation makes another excavation adjacent and parallel to the previously formed excavation. After the required number of excavations has been made and a shallow canal is formed it may be deepened by again digging by causing the machine to make a series of parallel excavations; usually a channel of this kind would be left with approximately inclined side walls and on them and also on the bottom of the channels a series of ridges would be left owing to the curved cutting or excavation produced by the circular digging plate. These ridges may if necessary be removed during the operation of the machine by shares or blades attached to the machine or by workmen after the excavation has been finished.

If the machine is to be used for cultivating a conveyer (or conveyers) deposit the earth removed by the digging plate to the rear of the machine in a thoroughly pulverized or broken up condition. Shares or blades may be attached to the rear of the machine for breaking the earth which is left between each strip of land broken up by the rotary digging plate. The machine having a conveyer adapted to transfer the earth to the rear of the machine may be used for making tunnels.

What I claim and desire to secure by Letters Patent of the United States is:—

A land digging or earth excavating machine comprising in combination, a rotary digging plate provided with a plurality of teeth on one face thereof adjacent to openings in the plate, an earth collecting drum at the rear of the plate, rotary blades in said collecting drum adapted to discharge the excavated earth in the collector through openings in the rear wall of the latter, the digging plate and rotary blades being centrally but independently mounted on concentric rotatable members, and a conveyer disposed at one side of the said concentric members.

N. ALCHEVSKY.